United States Patent [19]

Faughnan et al.

[11] Patent Number: 4,564,808

[45] Date of Patent: Jan. 14, 1986

[54] DIRECT DETERMINATION OF QUANTUM EFFICIENCY OF SEMICONDUCTING FILMS

[75] Inventors: Brian W. Faughnan, Princeton; Joseph J. Hanak, Lawrenceville, both of N.J.

[73] Assignee: The United States of America as represented by the United States Department of Energy, Washington, D.C.

[21] Appl. No.: 474,384

[22] Filed: Mar. 11, 1983

[51] Int. Cl.$^4$ .............................................. G01R 31/26
[52] U.S. Cl. ............................ 324/158 R; 324/158 D
[58] Field of Search ........... 324/158 R, 158 D, 158 T, 324/73 R

[56] References Cited

U.S. PATENT DOCUMENTS

| | | | |
|---|---|---|---|
| 4,051,437 | 9/1977 | Lile et al. | 324/158 D |
| 4,333,051 | 6/1982 | Goodman | 324/158 D |
| 4,456,879 | 6/1984 | Kleinknecht | 324/158 D |
| 4,464,627 | 8/1984 | Munakata et al. | 324/158 D |

Primary Examiner—Ernest F. Karlsen
Attorney, Agent, or Firm—Bruce R. Mansfield; Walter L. Rees; Judson R. Hightower

[57] ABSTRACT

Photovoltaic quantum efficiency of semiconductor samples is determined directly, without requiring that a built-in photovoltage be generated by the sample. Electrodes are attached to the sample so as to form at least one Schottky barrier therewith. When illuminated, the generated photocurrent carriers are collected by an external bias voltage impressed across the electrodes. The generated photocurrent is measured, and photovoltaic quantum efficiency is calculated therefrom.

11 Claims, 4 Drawing Figures

DIRECT DETERMINATION OF QUANTUM EFFICIENCY OF SEMICONDUCTING FILMS

CONTRACTUAL ORIGIN OF THE INVENTION

The United States Government has rights in this invention pursuant to Subcontract No. XG-1-1169-1 with RCA Corporation, under Contract No. EG-77-C-01-4042 between the U.S. Department of Energy and the Solar Energy Research Institute.

BACKGROUND OF THE INVENTION

This invention pertains to apparatus and methods used in the evaluation of semiconducting films prior to device fabrication, and in particular to an apparatus and a method of evaluation based on semiconductor film efficiency, which is predictive of device efficiency.

Photovoltaic quantum efficiency, as a function of wavelength of incident light, $QE(\lambda)$, provides a measure of the number of photogenerated carriers formed and collected in a semiconducting layer when exposed to illumination. $QE(\lambda)$ is the ratio of the number of current carriers (e.g. electrons) passing through an external measurement circuit and the number of photons, at wavelength $\lambda$, incident on the device. The knowledge of photovoltaic quantum efficiency, along with the easily measured $V_{oc}$, the open circuit voltage or the photovoltage across the cell at open circuit, allows one to estimate the maximum conversion efficiency ($\eta$) of the solar cell. The term "collection length," $l_c$, signifies the thickness of the semiconducting layer over which photogenerated carriers can be collected; beyond this length the carriers recombine and are lost, thereby decreasing the maximum conversion efficiency of the solar cell. The knowledge of both quantities $QE(\lambda)$ and $l_c$ is of great importance if discovered prior to fabricating solar cells, because together they determine the limit of ultimate conversion efficiency. Without this knowledge, the development of efficient solar cells becomes much more costly.

Current competitive design techniques for semiconductor device constructions employing new semiconducting film materials require a preliminary estimation of device performance without incurring the time or expense of complete prototype device construction. Prior art design techniques are limited in that two major parameters for measuring device efficiency, photovoltaic quantum efficiency $QE(\lambda)$ and collection length $l_c$, had to be determined from completed prototype photovoltaic or solar cells, and the prototypes had to be capable of generating a relatively high level, minimum, built-in photovoltage. Examples of such prototypes include completed p-n or p-i-n junctions, wherein p, n, and i, signify p-type, n-type and intrinsic-type conductivity, respectively. Other prototype examples include a Schottky barrier diode, consisting of a metal-semiconductor junction. In each of the above-described prototypes, two electrical contacts are necessary, with the second electrical contact being of the ohmic type. In all cases however, it was necessary for the solar cell to generate considerable built-in photovoltage which is the driving force that enables the photocurrent to be collected and measured. Two requirements must be met in order that a photovoltaic device produce the power required for performance evaluation. First, the sample device must contain material which absorbs light (the amorphous silicon i-layer) thereby creating electron-hole pairs in the material. Next, the device to be tested must have a "built-in" potential through which the collected carriers drop and thereby produce useful power. In conventional single crystal silicon solar cells, the carriers move to the region of potential drop (p-n junction) by diffusion. However in amorphous silicon solar cells this built-in potential also provides an internal field in the i-layer which aids in the collection of the carriers. An evaluation of more simple crystal samples that is independent of crystal type, and therefore independent of "built-in" potential, would be quite useful especially if the sample device by itself does not generate a photocurrent or photovoltage when illuminated i.e. when it does not exhibit a "built-in" potential. Such evaluation, if available, would allow an examination of the current collection properties of the i-layer in a sample test structure without the requirement of a built-in potential.

Prior evaluation methods suffer from the selective optical absorption of other preceding layers of the solar cell which further complicate the photovoltaic quantum efficiency determination and interpretation.

Further, it would be helpful if an evaluation method could provide information about the nature of the interface barriers. For example, the existence of a barrier gives rise to a built-in voltage at the interface which results in a depletion region inside the i-layer. In this region the electric field is high and the photogenerated carriers are swept out (collected as photocurrent). The width of the depletion region is also dependent on externally applied voltage. Thus, a careful study of $QE(\lambda)$ vs applied voltage allows one to determine the voltage barrier at the interface.

It is therefore an object of the present invention to provide a simplified apparatus and method for determining the quantum efficiency of semiconducting films without requiring the construction of an elaborate prototype sample.

It is another object of the present invention to provide a direct method of determining quantum efficiency of semiconductor samples which exhibit a heretofore unacceptably low level of "built-in" photovoltage.

It is an object of the present invention to provide an unambiguous interpretation of the blue response of a semiconducting sample i-layer such that any change in measured quantum efficiency is due only to the sample being tested.

Yet another object of the present invention is to provide a direct method of determining quantum efficiency of semiconducting films which avoids the selective optical absorption of illuminating radiation, through the elimination of preceding layers of a test prototype construction.

Another object of the present invention is to provide a test method which provides information about the nature of the interface barriers of a semiconductor sample.

A further object of the present invention is to provide a quantum efficiency test method which also provides an indication of the conductivity type of the sample being tested.

Yet another object of the present invention is to provide a universal quantum efficiency test method which is applicable to both types of conductivity materials, i.e., both n-type and p-type as well as intrinsic-type semiconducting materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided by an abbreviated test prototype construction which includes a transparent substrate such as glass, coated with a layer of transparent conductive oxide (TCO) which comprises a first electrode. The transparent conductive oxide may be overcoated with a thin layer dielectric or partially transparent metallic layer, but such is not required. The semiconductor layer to be tested is then deposited upon the transparent conductive oxide layer using conventional techniques, and a second electrode consisting of a layer of conductive oxide, preferably transparent, is applied thereupon, preferably by a dry method such as evaporation or the like. At least one, but preferably both of the electrodes are at least partially optically transparent. According to the invention, it is not necessary for the sample to generate a built-in photocurrent or photovoltage under illumination at zero applied voltage bias. Rather, an external voltage bias is applied to the sample during quantum efficiency testing wherein the function of the applied voltage bias is to supply the electric field necessary for collection, extraction, of photocarriers generated in the semiconducting layer.

DETAILED DESCRIPTION OF THE PREFERRED EMBODIMENT

Figure 1:
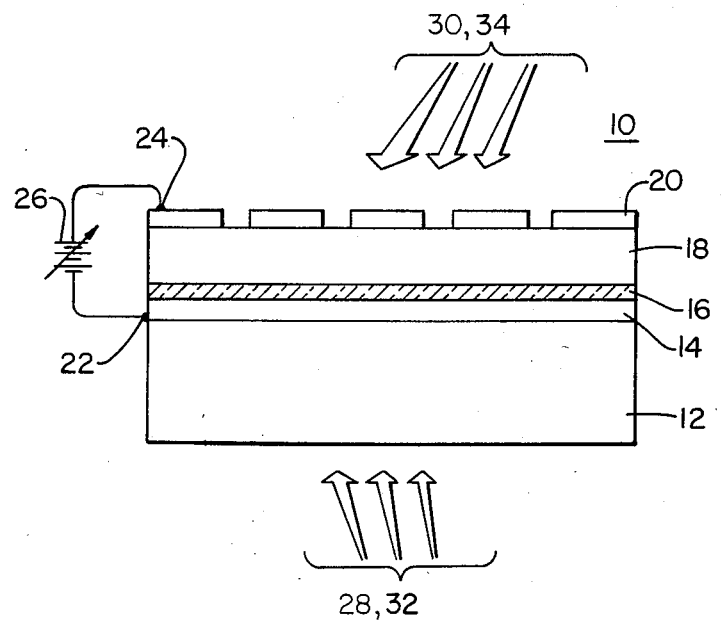
FIG. 1 is a schematic illustration of a prepared semiconductor sample, ready for testing.

Referring now to FIG. 1, a semiconductor test sample 10 prepared according to the invention will be described. Sample 10 consists of a transparent substrate 12 formed of borosilica glass or fused silica, but preferably soda lime glass overcoated with a transparent conductive oxide (TCO) layer 14 which is applied preferably by a dry method such as evaporation, sputtering, or chemical vapor deposition. TCO layer 14 may be comprised of indium tin oxide (ITO), tin oxide (SnO), or tin oxide doped with fluorine (SnOF). Alternatively, layer 14 may be comprised of a partially transparent metallic layer which does not inter-diffuse with adjacent sample layers, e.g. chromium, niobium or titanium materials. Substrate layer 12 typically has a thickness of 1–6 millimeters whereas TCO layer 14 has a thickness of 60–1,000 nanometers. An optional dielectric chemical barrier layer 16 is overcoated on TCO layer 14 in the preferred embodiment, to prevent diffusion of the metal component of layer 14 into adjoining layers which are formed thereupon, particularly those adjoining layers formed by glow discharge techniques, but such is not essential to the practice of the invention. Dielectric layer 16 may comprise a 1–2 nanometers thick layer of $SiO_2$ but preferably comprises a thicker layer of cermet, which has a higher conductivity. Layer 16 of the preferred embodiment comprised a 10 nanometer thick layer of Pt—$SiO_2$ cermet containing approximately 12 volume percent Pt. The two layers 14, 16 may conveniently form a one-quarter wave length antireflection (AR) coating which facilitates maximum light transmission therethrough.

A semiconductor layer 18 to be tested using the method of the present invention comprised, in the preferred embodiment, a 0.5 to 2.5 micrometer thick "intrinsic" (i.e., not intentionally doped) layer of a—Si:H. Layer 18 was deposited by radio frequency capacitive glow discharge techniques utilizing silane gas, as is known in the art. The aforementioned TCO layer 14 comprises a first electrode which is preferably continuous over the entire substrate 12 so as to "cover" the entire surface of the semiconductor layer 18. Alternatively, layer 14 may be "discontinuous" a term defined herein to include a "perforated" layer, i.e., one having voids therein. In either event layer 14 comprises an electrically conductive arrangement which extends over substantially the entire surface area of the semiconducting layer and, according to the invention, forms a Schottky barrier with semiconductor layer 18. Overlayed on a second surface of semiconductor sample 18 is a second electrode 20 comprising a discontinuous array of 0.05 $cm^2$ pads deposited on layer 18 utilizing RF sputtering techniques. The electrode array 20 is preferably comprised of titanium, but an optional improvement in contact resistance may be provided by depositing a layer of aluminum over the titanium pads. The electrode array 20 is deposited either through a mesh or through photolithography and etching techniques, utilizing a dilute mixture of HF and $HNO_3$ in water, as is known in the art. In the preferred embodiment, second electrode 20 is formed as a discontinuous array so as to form, in effect, a plurality of individual test cells, enabling simultaneous testing of a plurality of samples that have identical semiconductor characteristics. Alternatively, layer 20 could comprise a single continuous conductor, so as to form a single test sample. External electrode contacts 22, 24 are established on first and second electrodes 14, 20 utilizing any convenient technique as is known in the art. For example, the first TCO electrode may be contacted by means of a metal sample holder on which the substrate rests. The contact to the second discontinuous electrode may be made by means of a flexible wire probe having a gold-tipped ball on the contacting end.

Test sample 10 conveniently includes an external variable voltage DC power supply 26 which provides a bias voltage to the sample to be tested which aids collection of the generated photocarriers. The contacted area, defined by the area of the discontinuous second electrode, typically 0.05 to 1.0 $cm^2$, is illuminated through the transparent substrate 12 and layers 14, 16 by a light beam 28 and also by optional white light bias means 32. Illumination is incident on the side of the semiconductor sample where the photocarriers are generated, adjacent the Schottky barrier formed between electrode 14 and semiconductor layer 18. Alternatively, if the second electrode array 20 is of partially transparent construction, the contacted area may be illuminated by a second light beam 30 and white light bias 34. Power supply 26, in providing an applied bias, supplies the necessary electric field required to extract photogenerated carriers from the semiconducting sample 18. The particular advantage of the present invention is that it is not necessary that the sample show photocurrent or photovoltage under illumination at zero voltage bias.

Two requirements must be met in order that a photovoltaic device produce useful power. First, it must contain material which absorbs light (the amorphous silicon i-layer) so as to create electron-hole pairs in the material. Next, it must have a "built-in" potential through which the collected carriers drop and thereby produce useful power. In conventional single crystal silicon solar cells, the carriers move to the region of potential drop (p-n junction) by diffusion. However in amorphous silicon an inherent built-in potential also provides an internal field in the i-layer which aids in the collection of the carriers. In the present invention the inherent built-in potential is not necessary since the field is provided by means of external voltage. In the invention, the collected carriers are referred to as photocurrent, while the built-in potential gives rise to the photovoltage. An advantage of the present invention is that it allows the study of current-collection properties of the i-layer in a structure without the requirement of having a built-in potential. Thus the sample 10 need not exhibit a photocurrent or photovoltage when illuminated by sunlight, since it need not have any inherent built-in potential. Whereas the built-in potential has heretofore been obtained by forming p-i and i-n i-n junctions at the two i-layer interfaces, relaxation of this requirement greatly simplifies the fabrication of i-layer structures and permits quick evaluation of the i-layers. An additional advantage is that measurements of the complete structure facilitate more complicated analyses, whereas in prior test arrangements, it is frequently difficult to separate the effects of p- and n-layers from the i-layer.

As will be appreciated by those skilled in the art, the present invention eliminates the need for special electrode compositions and arrangements, that were heretofore required for built-in photovoltage. In the present invention, the electrodes used need not be dissimilar in a way that optimizes the built-in voltage for a particular semiconductor sample. Rather, the electrodes can by symmetric (i.e. electrically and structurally identical) for all devices tested, including completed photocells as well as single layer semiconductors.

Figure 4:
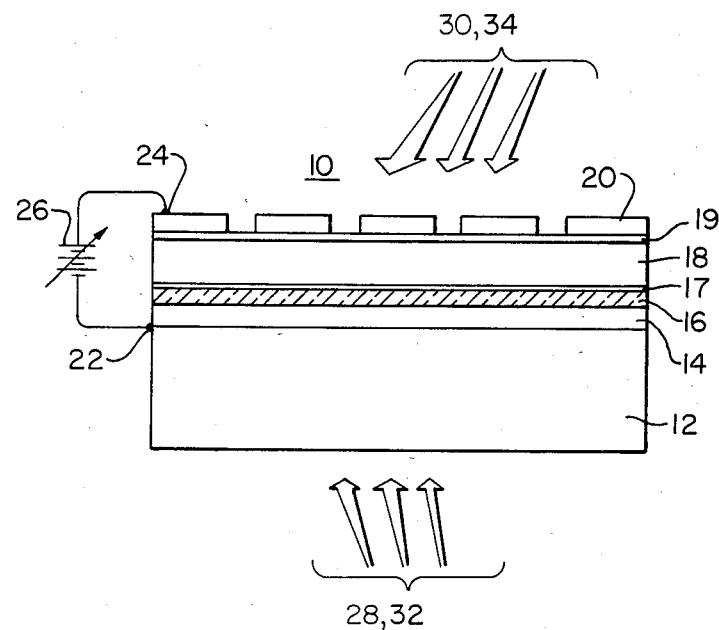
FIG. 4 is a schematic illustration of a prepared semiconductor sample, similar to that of FIG. 1.

An example of such analysis of a "completed photocell" is now described with reference to FIG. 4 wherein like components identical to those hereinbefore described in FIG. 1 contain like reference numerals. FIG. 4 is substantially identical to that of FIG. 1 except that the semiconducting layer to be evaluated now comprises three layers 17, 18, and 19 as opposed to the single layer 18 mentioned before. FIG. 4 is intended to illustrate analysis according to the invention of a completed photocell which is unsuitable for testing according to conventional means, in that it exhibits an insufficient photovoltage when illuminated. The sample to be tested in FIG. 4 comprises an i-layer 18 disposed between n-doped layer 19 and p-doped layer 17. For example, layers 17, 18 and 19 have thicknesses of 10 nanometers, 500 nanometers, and 20 nanometers respectively. An ohmic contact is established between layers 19 and 20 whereas a homojunction is established between layers 17, 18. The method of the present invention is particularly useful where an insufficiently small photovoltage or no photovoltage at all is exhibited in the junction between layers 18 and 19. The only limitations placed on the "completed photocell" by the present invention is that the layer intervening between the semiconducting layer to be evaluated, herein layer 18, and the external electrode not impede the flow of generated photocarriers therethrough when the semiconducting layer to be evaluated is illuminated by a radiation source. It will be appreciated by those skilled in the art that the evaluation according to the present invention is advantageous in that it is independent of the quality of the junction of the photocell and is also independent of the magnitude or indeed the presence of photovoltage exhibited by the test sample. The photovoltage ($V_{oc}$) can be separately determined in the complete solar-cell structure, such as the p-i-n cell, and does not vary extensively for a wide variety of i-layers of similar materials.

This invention is primarily concerned with determining the photocurrent that can be generated in the i-layer as a function of the wavelength of the incident light. This is accomplished by the measurement of the quantum efficiency, $QE(\lambda)$. The photocurrent J may be obtained from a knowledge of $QE(\lambda)$, and the known solar energy flux by means of the equation $$J = \sum_{\Delta\lambda} QE(\lambda) \cdot F(\lambda)$$

where $F(\lambda)$ is the solar irradiance at wavelength $\lambda$, $\Delta\lambda$ is the wavelength interval between $QE(\lambda)$, measurements, and the sum is carried out over all wavelengths over which $QE(\lambda)$ is measured. Alternatively, as in the preferred embodiment, quantum efficiency is determined from the above relationship wherein photocurrent and solar irradiance are measured according to the test set-up which will now be described.

Figure 2:
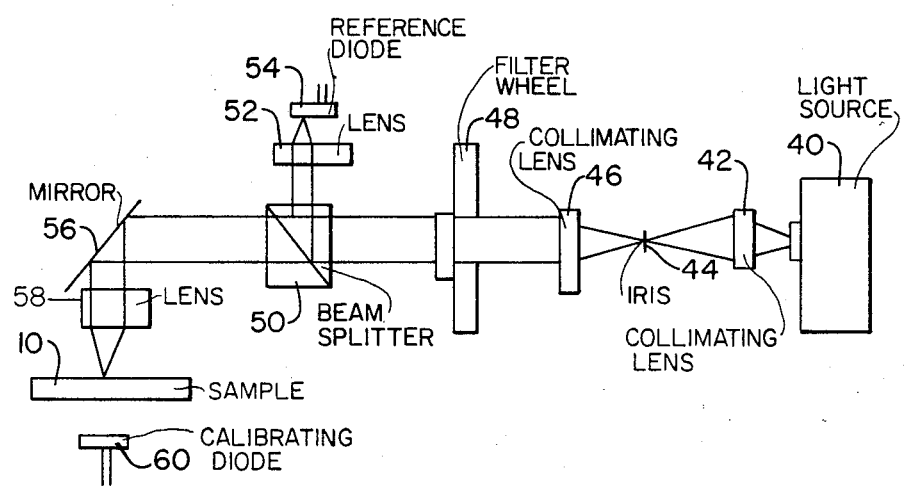
FIG. 2 is a schematic diagram of test apparatus used in the method according to present invention.

Referring now to FIG. 2, a schematic diagram of the apparatus used with the method of the present invention is shown. A light source 40, which may take the convenient form of a 150 watt xenon lamp, is directed through a light collimating lens 42, iris 44 and collimating lens 46 to filter wheel 48. Filter wheel 48 allows selection of the wave length of illumination by selecting a series of 15, 10 nanometer wide interference filters contained on sections of a rotatable wheel. Alternatively, a monochrometer could be used for this purpose as a substitute of the afore-mentioned apparatus. A collimated and filtered light is then directed to beam splitter 50 which directs a portion of the incident light through a lens 52 to a reference diode 54. Reference diode 54 provides stable measurement of the quantum efficiency and collection length, independent of changes in the light output of source 40. The other portion of incident light emerging from beam splitter 50 is directed to a mirror 56 and through lens 58, so as to be incident on sample 10. A photocurrent generator or calibrating diode 60 is used to calibrate the apparatus in order to obtain absolute quantum efficiency determinations in the following way. The absolute $QE_c(\lambda)$ of the calibrating diode is known beforehand, for each corresponding calibrated photocurrent $J_c(\lambda)$ generated in the photodiode in response to illumination thereof by a source having a wavelength $\lambda$. Then the ratio of the photocurrent from the test cell $J_s(\lambda)$ and of the photocurrent from the calibrating diode $J_c(\lambda)$ under identical light conditions allows one to determine the $QE_s(\lambda)$ of the test cell according to the following relationship:

$$QE_s(\lambda) = \frac{J_s(\lambda)}{J_c(\lambda)} QE_c(\lambda)$$

In practice, the system is run automatically under computer control, and a complete quantum efficiency determination is carried out in less than 1 minute.

Figure 3:
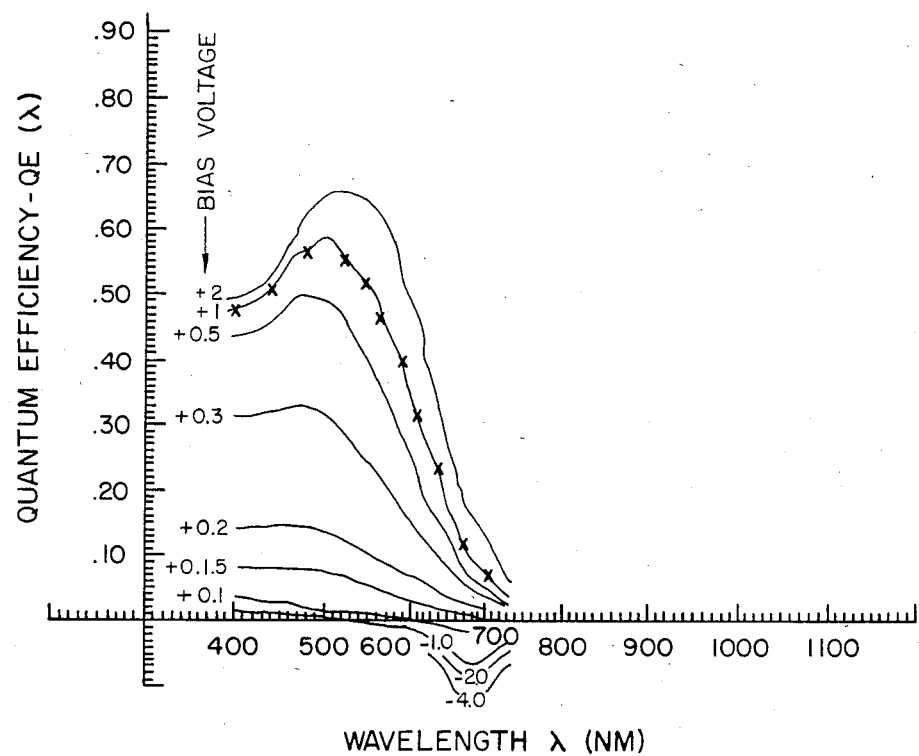
FIG. 3 is a graph depicting test results using the method accordingly to the invention.

With reference to FIG. 3, a typical series of quantum efficiency curves for different applied bias voltages is shown. Normally, the quantum efficiency value in the region to the right of the peak i.e. the region of red response, increases with increasing applied bias of appropriate sign. This is expected since increasing the applied electric field tends to increase the collection length $l_c$ and hence more current is collected. If one has a convenient mathematical model for the operation of a solar cell utilizing a semiconducting sample of the type actually tested, then an actual value for collection length can be obtained by suitable analysis of the curves in FIG. 3. For example, one model [R. S. Crandall, RCA Review 42, 441–457, September 1981] derives the following expression for quantum efficiency as a function of collection length, $$QE(\lambda)/QE_{max}(\lambda) = l_c/L\,[1-\exp(L/l_c)]$$

where $QE_{max}(\lambda)$ is the saturated value of $QE(\lambda)$ obtained for high reverse bias voltage applied across the cell, and L is the thickness of the i-layer. The above model applies when the electric field extends across the entire i-layer. The mathematical form of this expression has been verified for many actual amorphous silicon solar cells. However, if such mathematical model is lacking, the change in quantum efficiency-red response with reverse bias voltage can be used to establish a "Figure-of-merit" for the material tested. There is an inverse relationship which prevails: the smaller the change in quantum efficiency with reverse bias, the longer the collection length of the material tested. The blue response of the sample being tested is also of interest in designing materials for amorphous silicon solar cells. Blue response occurs in the region of 400–500 nanometers. The method of the present invention avoids contamination of the initially deposited layer of amorphous silicon, which leads to a reduced blue response. The present invention avoids further reduction in blue response caused by test arrangements requiring a complete P-I-N cell, with the light passing through another amorphous silicon layer before it reaches the intrinsic sample or i-layer being tested, thus rendering interpretation of the blue response difficult or uncertain. Utilizing the method of the present invention any change in quantum efficiency is due only to the i-layer, and so the interpretation of the blue response curve is unambiguous. The method according to the invention has been applied successfully to an intrinsic i—a—Si:H-layer, and to a a layer slightly doped with diborane, containing about $4\times 10^{17}$ atoms of boron per cubic centimeter of a—Si:H.

Under appropriate bias in the range of $-2$ to $+2$ volts per micron thickness of the i-layer, the quantum efficiency curves for both undoped and lightly doped i-layers looked very similar to the quantum efficiency curves of actual solar cells as, for example, those having the structure of glass substrate/TCO/p-i-n a—Si:H/metal, in spite of the fact that the i-layer is over two micrometers thick.

Another important feature of this invention is its ability to identify the conductivity type of the semiconducting layer. A particular "intrinsic" a—Si:H-layer tested turned out to be slightly n-type (n−). Whether or not this is due to the presence of small amount of n-type dopant such as phosphorus has not been determined, although addition of phosphours renders it n-type. Addition of small excess boron into the growing a—Si:H-layer will make it weakly p-type (p−). Excess of either impurity thus can be introduced by design or inadvertently by contamination. The conductivity type has a profound effect on the efficiency of the solar cell, hence it is of paramount importance to determine it prior to fabricating a completed solar cell.

In the present invention, the conductivity type can be determined from the polarity of the voltage bias required to obtain normal, high $QE(\lambda)$ values at lower light wavelengths (for a—Si:H in the range of 400 to 600 nm) such as in FIG. 3. The semiconductor is n-type when the electrode closest to the light source must be negative and conversely it is p-type if the electrode must be positive. This is referred to as negative or positive bias, respectively. Thus, in FIG. 3, where high $QE(\lambda)$ values were obtained with a positive bias voltage, the sample was p-type. This sample was deposited from silane gas containing a concentration of one-half part per million (ppm) of diborane. A negative bias of up to $-4$ V in FIG. 3 shows a weak response in the wavelength range of 600 to 700 nm (in the negative direction of QE because the polarity of the photocurrent is changed with the bias). For n-type samples such as undoped intrinsic samples of a—Si:H or samples made from silane containing 0.2 ppm of phosphine, $QE(\lambda)$ curves similar to those of FIG. 3 were obtained, however, at a reversed polarity of the bias voltage. That is, high $QE(\lambda)$ values were obtained when bias voltage was negative.

For uniform films the $QE(\lambda)$ data are similar whether the sample is illuminated through the substrate or through the film. With respect to the polarity of the voltage bias, it has to follow the light source as described above. For quantitative comparison of the $QE(\lambda)$ data from both directions it is necessary to determine the light absorption of the intervening electrode layers and substrates and make necessary corrections.

The embodiments of the invention in which an exclusive property or privilege is claimed are defined as follows:

1. A method for determining the quantum efficiency $QE(\lambda)$ of a single layer semiconductor sample of substantially a single conductive type, have first and second opposed surfaces, wherein the method is independent of built-in photovoltage, comprising the steps of:

forming, with a first at least partially transparent electrode, a Schottky barrier with at least one of said first and second surfaces of said semiconductor sample;

forming with a second electrode, an electrical connection with the other of said first and said second opposed surfaces of said semiconductor sample;

connecting between said first and second electrodes an external source of bias voltage;

further connecting between said first and said second electrodes, a means for measuring a sample photocurrent $J_s(\lambda)$ in said semiconductor sample;

positioning adjacent said semiconductor sample, a calibrated photocurrent generator having known values of quantum efficiency $QE_c(\lambda)$ for each corresponding calibrated photocurrent $J_c(\lambda)$ generated in said calibrated photocurrent generator in response to illumination thereof by radiant energy having a wavelength $\lambda$;

illuminating both said semiconductor sample through said first electrode and said calibrated photocurrent generator under identical light conditions with the same radiant energy, so as to generate photocurrents in said semiconductor sample and said calibrated photocurrent generator;

inducing a voltage across said semiconductor sample with said external source of bias voltage so as to collect said sample photocurrent at said first and second electrodes;

measuring said generated sample photocurrent $J_s(\lambda)$;

measuring said calibrated photocurrent $J_c(\lambda)$;

determining quantum efficiency of the sample, $QE_s(\lambda)$, according to the following relationship:

$$QE_s(\lambda) = \frac{J_s(\lambda)}{J_c(\lambda)} \cdot QE_c(\lambda)$$

2. The method of claim 1, wherein said calibrated photocurrent generator comprises a photodiode.

3. The method of claim 1 further including the step of forming a dielectric diffusion barrier between said first electrode and said semiconductor sample.

4. The method of claim 3, wherein said first electrode and said dielectric diffusion barrier together comprise a one-quarter wavelength antireflection coating.

5. The method of claim 1 wherein said second electrode is partially transparent to illuminating radiation, further including the step of illuminating said semiconductor through said second electrode with radiant energy so as to generate a photocurrent in said semiconductor sample.

6. The method of claim 5, wherein said second electrode is joined to said semiconductor sample so as to form a Schottky barrier therewith.

7. The method of claim 1, wherein said first electrode extends over the substantially entire surface area of the semiconductor layer and said electrode comprises an array of separate spaced-apart electrode pads each having means for separate electrical connection to said external source of bias voltage and said photocurrent measurement means.

8. The method of claim 1 further including the step of connecting the external source of bias voltage to said first and said second electrodes with a polarity such that normal $QE(\lambda)$ values are observed at low light wavelengths;

observing the polarity of the external source of bias voltage connection which is connected to the electrode which is closest to said radiant energy illumination whereby the conductivity type of said semiconductor sample is determined as being n-type when the voltage plurality at said electrode is negative, and said semiconductor sample is determined as being p-type when the voltage polarity at said electrode is positive.

9. An apparatus for evaluating the quantum efficiency $QE(\lambda)$ of a semiconductor sample of substantially a single conductivity type having first and second opposed surfaces, the apparatus including a calibrated photocurrent generator having a known quantum efficiency $QE(\lambda)$ for each corresponding calibrated photocurrent $J_c(\lambda)$ generated in said calibrated photocurrent generator in response to illumination thereof by an illuminating radiation having a predetermined wavelength $\lambda$, the apparatus further including illumination means for generating illumination of a constant intensity and for selecting illumination of said predetermined wavelength for illuminating substantially all of one of said surfaces of said semiconductor sample and said calibrated calibrated photocurrent generator under identical light conditions by the same illuminating radiation so as to generate photocurrent in both said semiconductor sample and said calibrated photocurrent generator, a first electrode connected to one of said first and said second surfaces of said semiconductor sample so as to form a Schottky barrier therewith, said first electrode being at least partially transparent to external illumination;

a second electrode connected to the other of said first and second surfaces, external bias voltage means, photocurrent measurement means, electrical connection means connecting said first and second electrodes to said external bias voltage means to induce a voltage across said semiconductor sample, said electrical connection means further acting to connect said first and said second electrodes to said photocurrent measurement means for measuring the sample photocurrent $J_s(\lambda)$ generated in said semiconductor sample with said semiconductor sample exposed to said illuminating radiation and to connect said photocurrent generator to said photocurrent measurement means for measuring the photocurrent $J_c(\lambda)$ with said calibrated photocurrent generator exposed to said illumination radiation.

10. The arrangement of claim 9 wherein said calibrated photocurrent generator comprises a photodiode disposed adjacent said semiconductor sample so as to be illuminated with said illuminating radiation, under light conditions identical to those of said semiconductor sample.

11. The apparatus of claim 9 wherein said illumination means includes a rotatable filter wheel having a plurality of interference filters, each of said filters acting to pass illumination of a different predetermined bandwidth and different predetermined wavelength $\lambda$, said wheel being positioned so that a single one of said filters is selectively positioned in the path of said illuminating radiation for selecting illumination of said wavelength $\lambda$.

* * * * *